United States Patent [19]

Seider et al.

[11] 4,019,022
[45] Apr. 19, 1977

[54] STORAGE SYSTEM FOR HOT FOOD TRAYS

[75] Inventors: Gene J. Seider, Bloomington; Michael C. Freund, Mendota Heights; James R. Duffy, West St. Paul, all of Minn.

[73] Assignee: Gould Inc., Chicago, Ill.

[22] Filed: Apr. 30, 1975

[21] Appl. No.: 573,078

[52] U.S. Cl. .............................. 219/386; 165/48; 219/400; 219/403; 219/404; 219/447; 219/521; 219/541

[51] Int. Cl.² ....................................... F27D 11/02

[58] Field of Search .......... 219/214, 218, 385, 386, 219/387, 400, 403, 404, 447, 521; 34/219; 126/21 A; 165/2, 48; 312/214, 330, 336; 426/107, 234, 412, 520, 523, 524

[56] References Cited

UNITED STATES PATENTS

| | | | |
|---|---|---|---|
| 1,897,879 | 2/1933 | Antrim | 219/403 |
| 3,097,901 | 7/1963 | Schless, Jr. | 312/330 |
| 3,175,534 | 3/1965 | Pollard | 219/400 UX |
| 3,199,579 | 8/1965 | Foster et al. | 165/48 |
| 3,311,434 | 3/1967 | Dyer et al. | 312/214 |
| 3,387,114 | 6/1968 | Brake, Jr. et al. | 219/386 |
| 3,518,949 | 7/1970 | Stock | 219/400 X |
| 3,836,220 | 9/1974 | Ishammar | 312/236 |
| 3,895,215 | 7/1975 | Gordon | 219/400 |
| 3,908,749 | 9/1975 | Williams | 165/2 |
| 3,924,100 | 12/1975 | Mack et al. | 219/386 |

*Primary Examiner*—Volodymyr Y. Mayewsky
*Attorney, Agent, or Firm*—Leydig, Voit, Osann, Mayer & Holt, Ltd.

[57] ABSTRACT

A storage system for a plurality of food trays includes one or more storage modules each having multiple pairs of horizontal rails for supporting a plurality of trays with the hot food positioned along one side wall of the module and the cool food along the other side wall. Forced air inlet means in the rear wall and adjacent the side wall on the hot food side of the tray produces a forced air stream flowing forwardly through the module over the hot food on the trays. A door covers the front of each module and forms air outlet means adjacent the module side wall on the hot food side of the trays so that the forwardly flowing air stream exits through the door. This system is particularly suitable for use with trays which have electrical heating elements embedded in one side of the tray for heating the hot foods thereon. The electrical heaters within the trays have contacts on the bottoms of the trays at the rear ends thereof, and each tray station within the storage module has a plurality of spring contacts for engaging the tray contacts and connecting them to an on-board source. At least one of the rails in each pair has a separately projecting lug near the front of the module for engaging a complementary notch in the bottom of the tray when the tray is fully inserted into the module. Then the spring contacts urge the rear ends of the trays upwardly against the guide surfaces to urge the front ends of the trays downwardly toward the lugs to latch the trays firmly in position.

3 Claims, 7 Drawing Figures

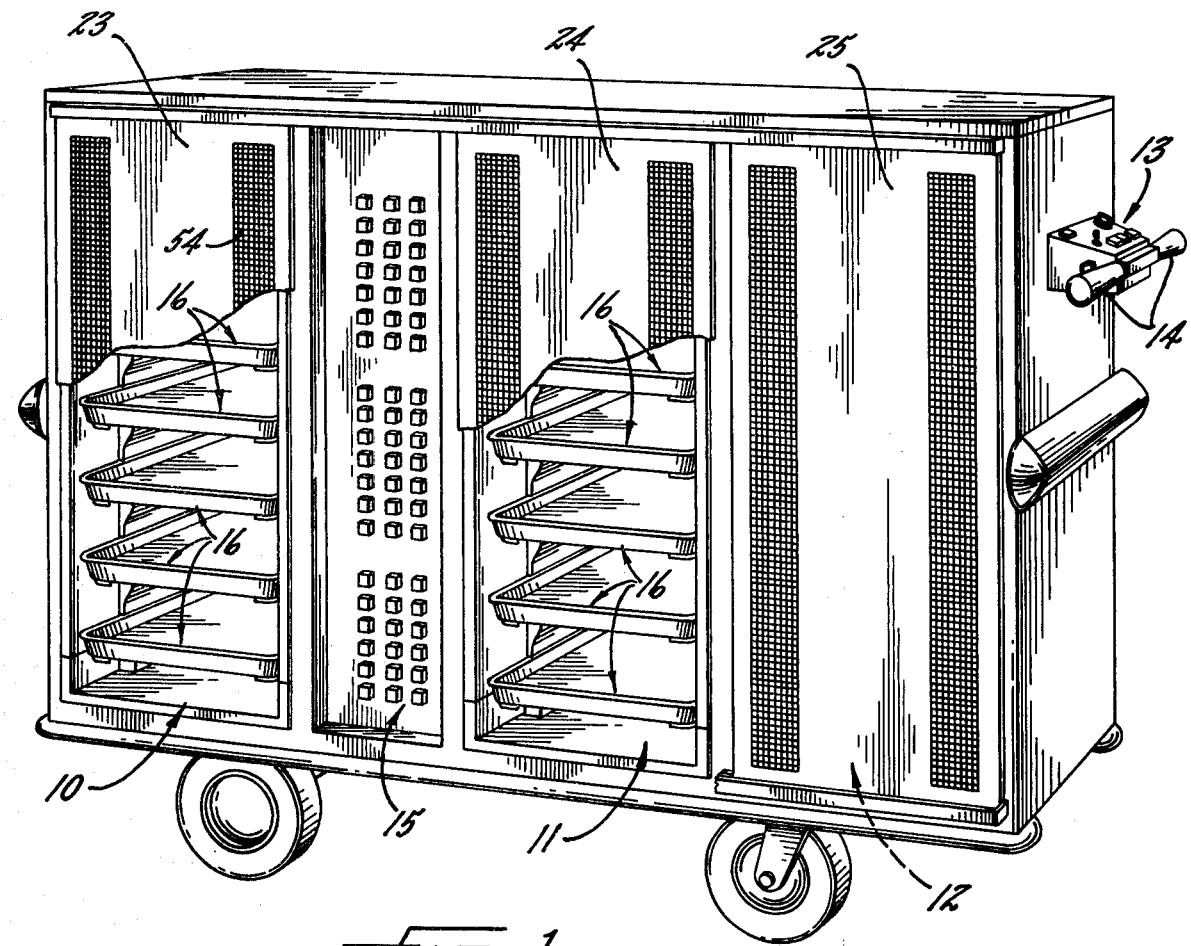
Fig. 1.
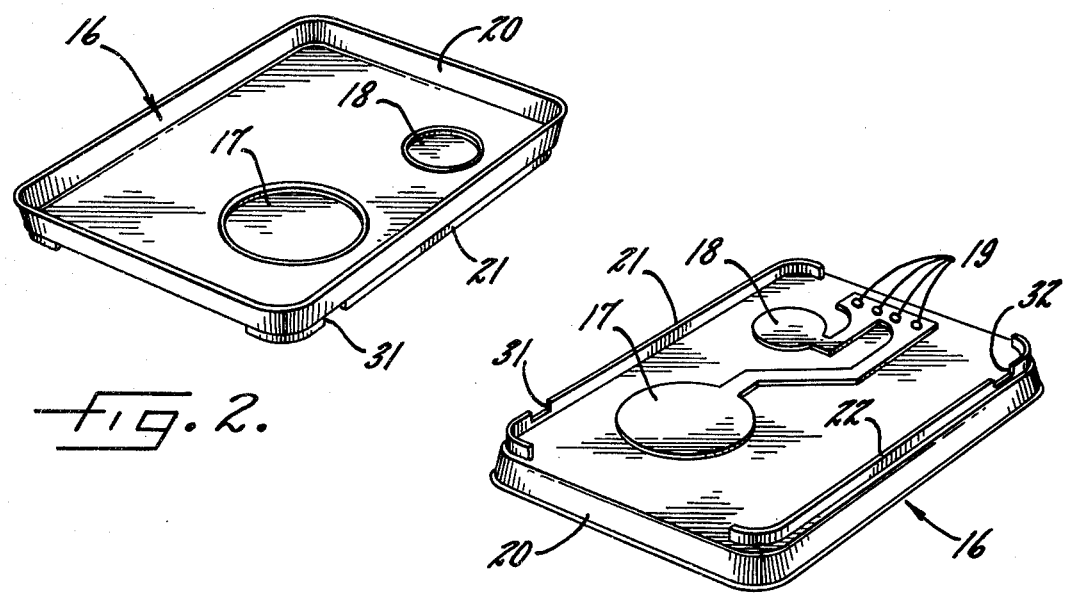
Fig. 2.
Fig. 3.

STORAGE SYSTEM FOR HOT FOOD TRAYS

CROSS REFERENCES TO RELATED APPLICATIONS

1. Ser. No. 570,191 filed Apr. 21, 1975 entitled "Food Service Vehicle" (Seider and Freund).
2. Ser. No. 573,344 filed Apr. 30, 1975 entitled "Electronic Control System for Multiple Electric Heating Stations" (Seider and Freund).
3. Ser. No. 573,079 filed Apr. 30, 1975 entitled "Food Service Vehicle" (Seider, Freund and Duffy).
4. Ser. No. 573,100 filed Apr. 30, 1975 entitled "Control Circuit for Electrically Propelled Vehicle" (Seider and Freund).
5. Ser. No. 573,080 filed Apr. 30, 1975 entitled "Battery Charging System" (Seider and Freund).

DESCRIPTION OF THE INVENTION

The present invention relates generally to tray storage systems and, more particularly, to a storage system for hot food trays which are individually removable from their storage container.

It is a primary object of the present invention to provide an improved storage system for trays which contain both hot and cool foods, and which maintains a temperature differential between the different portions of each tray which contain the hot and cool foods.

It is another object of the invention to provide such an improved tray storage system that is suitable for use with food trays that have preselected portions thereof electrically heated to maintain hot foods thereon at a desired serving temperature, and wherein the same trays have unheated portions for carrying cool foods such as salads.

A further object of the invention is to provide such an improved tray storage system which holds the trays firmly in place in the storage container. In this connection, a related object of the invention is to provide such a tray storage system which maintains a reliable electrical connection between the trays and the storage container, even when the storage container is portable and subject to vibration and jolts.

Still another object of the invention is to provide such an improved tray storage system which can be economically manufactured by vacuum forming, even when made large enough to hold ten or more trays carrying full meals.

A still further object of the invention is to provide such an improved tray storage system which is suitable for use in a food service vehicle.

Other objects and advantages of the invention will be apparent from the following detailed description and the accompanying drawings, in which:

FIG. 1 is a perspective view of a food service vehicle embodying the invention, with segments of the doors broken away to show the internal structure;

FIG. 2 is a top perspective view of a food tray for use in the vehicle of FIG. 1;

FIG. 3 is a bottom perspective of the food tray shown in FIG. 2;

Figure 4:
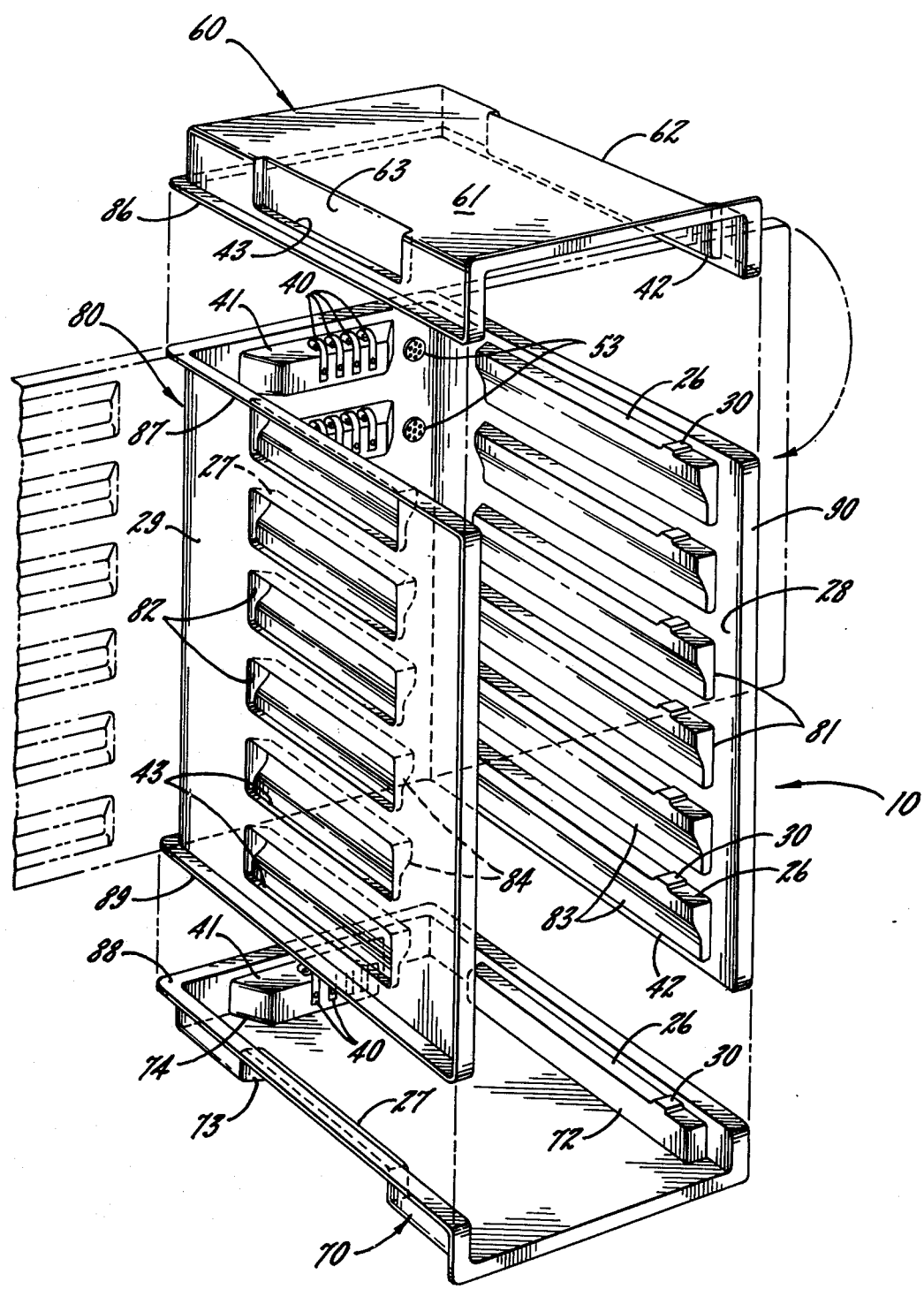
FIG. 4 is an exploded perspective of one of the tray storage modules in the vehicle of FIG. 1, with phantom lines illustrating the center section of the module as initially formed.

While the invention will be described in connection with certain preferred embodiments, it will be understood that it is not intended to limit the invention to those particular embodiments. On the contrary, it is intended to cover all alternative, modifications and equivalents as may be included within the spirit and scope of the invention as defined by the appended claims.

Turning now to the drawings and referring first to FIG. 1, there is shown a food service vehicle containing three tray storage modules 10, 11 and 12 embodying the system of this invention. The particular vehicle illustrated is self propelled, with the manual drive controls located on a panel 13 carrying a pair of handles 14 which are used to steer the vehicle. A second control panel 15 on the side of the vehicle is used to control electrical heating elements which are embedded in each food tray 16 to heat preselected areas 17 and 18 (FIGS. 2 and 3) adapted to receive a hot plate and a soup bowl, respectively. The tray heating elements are connected to the metallic contacts 19 at the rear end of the bottom of the tray. Each tray 16 has a raised lip 20 extending around the entire periphery of the top surface of the tray, and a pair of runners 21 and 22 depending from the bottom of the tray. Each of the modules 10, 11 and 12 has the capacity of holding a number of different trays 16 which are inserted into the modules when they are opened by sliding one or more of the doors 23, 24 and 25 clear of their respective modules. To support the trays in vertically spaced relation within each module, a multiplicity of horizontal rails 26 and 27 are formed on the opposed side walls 28 and 29 thereof.

In accordance with one important aspect of the invention, at least one of the rails in each pair has an upwardly projecting lug near the front of the module for engaging a complementary notch in the bottom of the tray when the tray is fully inserted in the module, a plurality of guide surfaces are disposed above the rails for limiting vertical movement of the trays above the rails, and a plurality of electrical spring contacts engage the heater contacts at the rear end of the bottom of the tray to urge the rear of the tray upwardly against the guide surfaces and thereby urge the front of the tray downwardly toward the lugs to firmly latch the tray in position. Thus, in the illustrative embodiment, each of the rails 26 on the right hand side walls 28 of each module forms a raised lug 30 which fits into a notch 31 or 32 (FIG. 3) formed in the runners of each tray 16. When a tray is carrying hot food in the spaces 17 and 18, the tray is inserted with the heater contacts 19 at the rear of the storage module to connect the heaters to a power source housed behind the control panel 15. In this position, it is the notch 31 in the tray runner 21 that registers with the lug 30 to retain the tray within the module. When the tray is carrying soiled dishes, or only cool food, it may be inserted into the module with the heater contacts 19 at the front of the module, in which the notch 32 in the tray runner 22 registers with the lug 30 to retain the tray within the module. In either case, the vertical shoulder formed by the rear side of the lug 30 cooperates with the complementary shoulder formed by the rear edge of one of the notches 31 and 32 to latch the tray in the module when the tray is fully inserted therein.

When the heater contacts 19 are located at the rear of the storage module 10, the contacts engage a corresponding row of spring contacts 40 (FIGS. 4–7) mounted on a land 41 formed by the rear wall of the module. There is one land 41 for each tray station, and the spring contacts thereon are all connected to the on-board power source. The spring contacts 40 not only provide the desired electrical connections to the tray heater elements, but also urge the rear end of the tray upwardly against guiding surfaces 42 and 43 located above the respective rails 26 and 27. This elevates the rear end of the tray slightly above the rails 26 and 27, as can be seen in FIG. 6, thereby urging the forward end of the tray downwardly against the rails 26 and 27 to ensure a positive latch with the lug 30. That is, the guiding surfaces 42 and 43 terminate forwardly of the spring contacts 40, so the surfaces 42 and 43 form a fulcrum located between the spring contacts 40 and the lug 30, on the opposite side of the tray from the lug 30, so that the forward end of the tray is pivoted downwardly against the lug 30. It will be appreciated that the space between each rail 26 or 27 and the adjacent guiding surface 42 or 43 must be slightly greater than the vertical demension of the tray to permit the runners 21 and 22 to slide over the lug 30 before one of the notches 31 or 32 comes into register with the lug 30.

As seen most clearly in FIG. 6, the spring contacts 40 are secured at one end to the front wall of the land 41 and at the other end to the top of the land 41, with the spring metal being bowed upwardly above the top of the land 41 to meet the tray contacts 19 as they are advanced over the spring contacts 40. On the rear side of the module, the lower fasteners for the spring contacts 40 are connected to power lines 44 leading to the power source for energizing the tray heaters.

In accordance with another important aspect of the invention, the food trays are adapted to carry the hot food along one side wall of the storage module and the cool food along the other side wall, a forced air inlet is provided in the rear wall of the module adjacent the side wall on the hot food side of the tray so that incoming forced air flows forwardly through the module with air outlet means adjacent the module side wall on the hot food side of the trays so that the forwardly flowing air exits through the door. The door also preferably forms fresh air intake means adjacent the module side wall on the cool food side of the trays so that the forwardly flowing forced air draws fresh air into the module and toward the rear wall of the module over the cool food on the trays. Thus, in the illustrative embodiment of the invention, both heated areas 17 and 18 of the trays 16 are located on the same side of the tray so that when the tray is inserted into one of the storage modules with the electrical contacts at the rear of the module, the hot food is positioned along the right hand side wall 28. To prevent the heat from the hot food side of the tray from excessively increasing the temperature on the other side of the tray module, where the cool foods such as salads and the like are located, a blower 50 (FIG. 7) forces fresh air through a filter into a vertical plenum 51 mounted on the rear of each tray module. From the plenum 51, the forced air passes through an air inlet port 52 in the rear wall of the module adjacent the side wall on the hot food side of the tray. Consequently, the incoming forced air flows forwardly through the module over the hot food on the trays, with a diffuser 53 mounted in the inlet port 52 spreading the forced air over the two heated areas 17 and 18.

At the front of the module, the forced air exits through a grill 54 formed in the right hand side of the door 23. Thus, the heat that escapes from the heated regions 17 and 18 is continuously swept forwardly through the module and exhausted through the air outlet provided by the door grill 54, thereby preventing the heat from being carried over to the unheated side of the tray which carries the cool food. The grill 54 in the module door extends throughout the full height of the module, and a separate forced air inlet port 52 is provided at each tray station so that a separate forced air stream is formed between each pair of adjacent trays. Of course, the trays themselves serve as barriers to block the flow of heat in the vertical direction, but even if a tray is absent from a given station or stations, any heat that escapes upwardly from the forwardly flowing stream of forced air will encounter the forwardly flowing stream at the next air inlet before it can move laterally to the unheated side of the tray.

Figure 5:
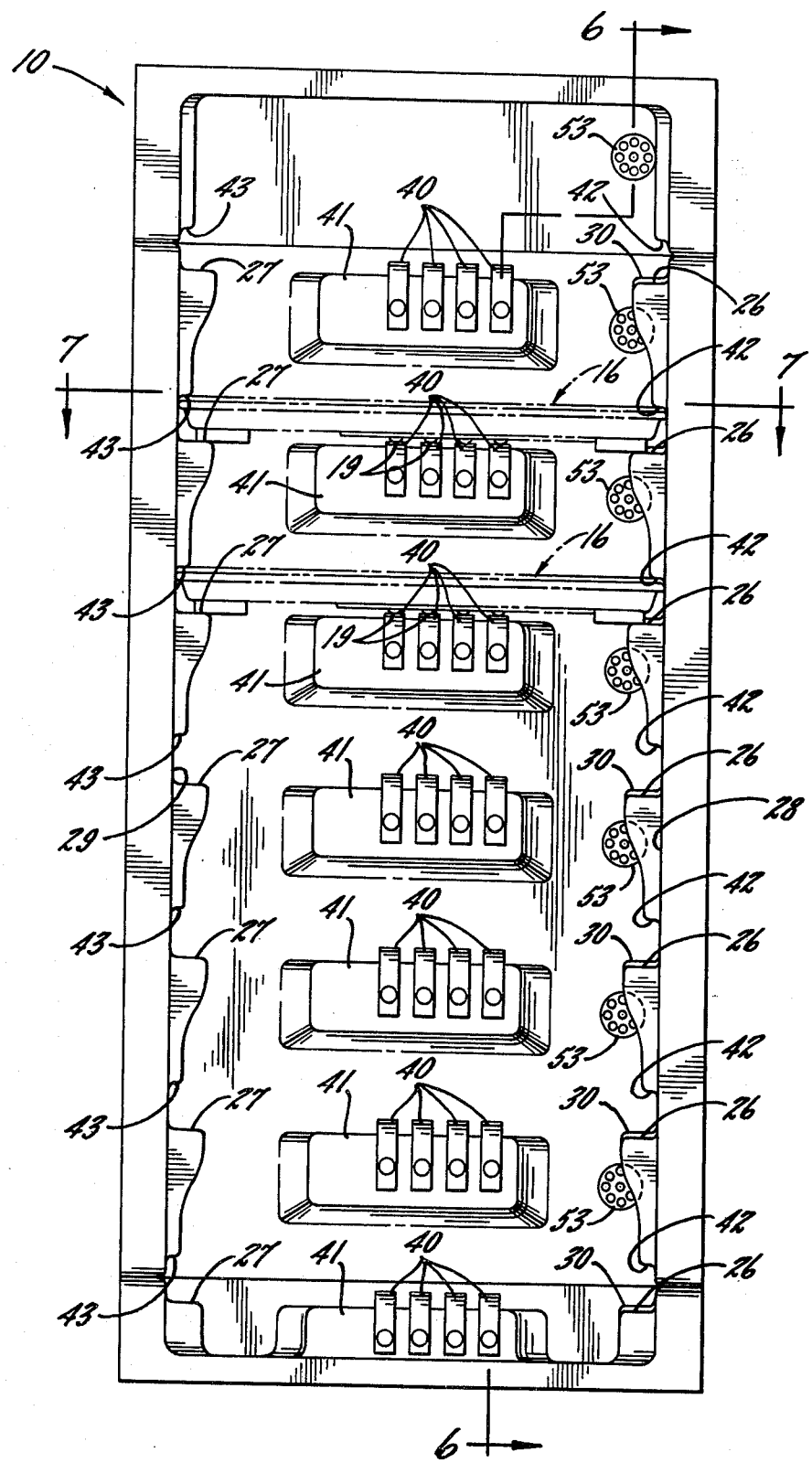
FIG. 5 is an enlarged front elevation of one of the tray storage modules in the vehicle of FIG. 1.
Figure 6:
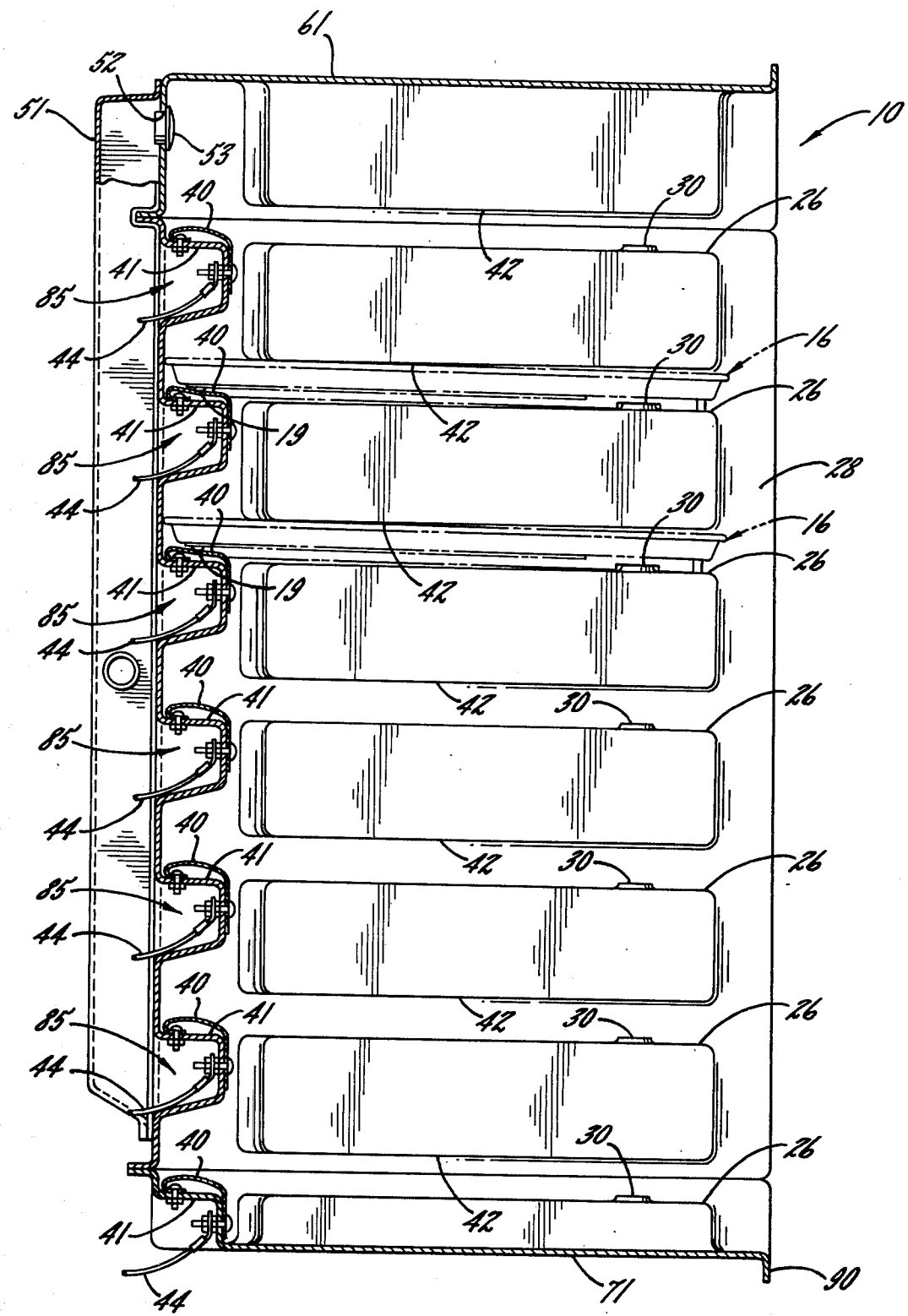
FIG. 6 is a vertical section taken along lines 6—6 in FIG. 5.
Figure 7:
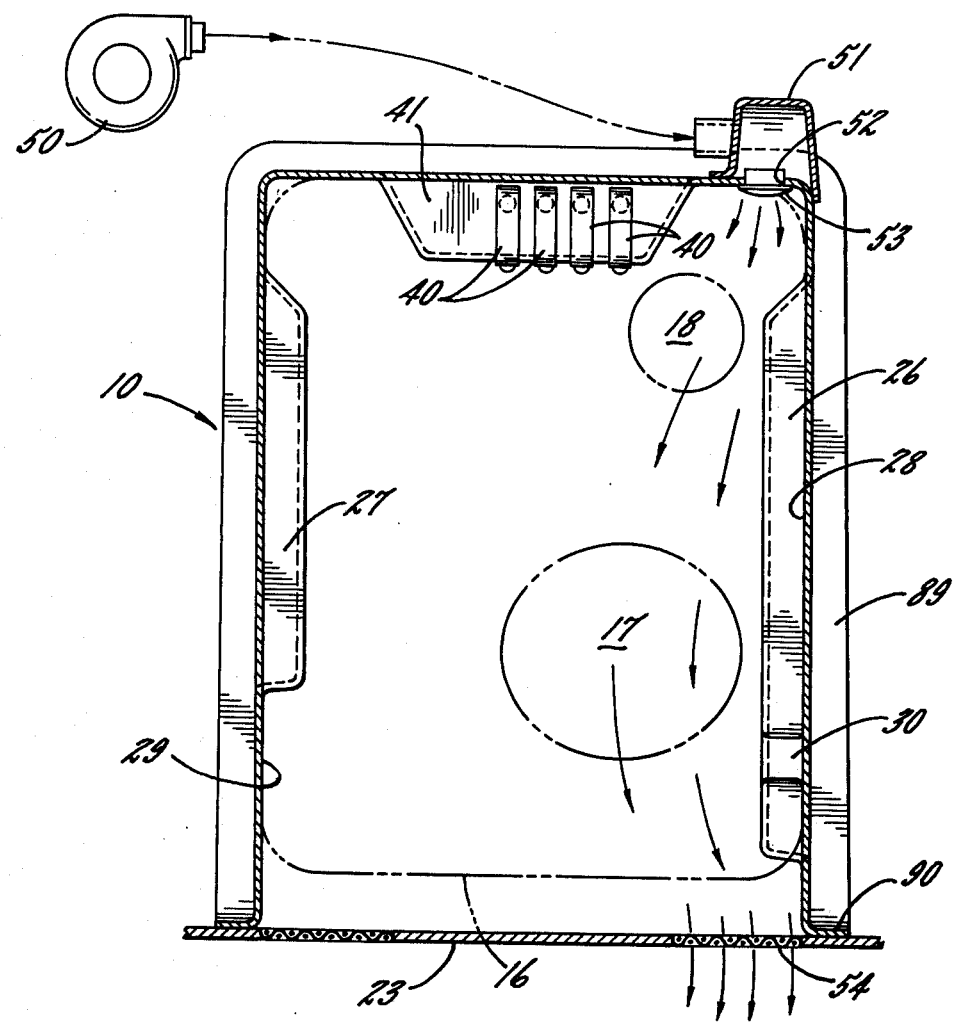
FIG. 7 is a horizontal section taken along lines 7—7 in FIG. 5 and also showing the air blower that is used to ventilate the module and a fragment of the door which also forms a part of the ventilation system, and with arrows indicating the air flow pattern.

As can be seen most clearly in FIG. 5, the air inlet ports 52 are located above the normal level of the hot food dishes carried by the trays 16, so the forwardly flowing stream of forced air does not have any significant cooling effect on the hot dishes. Rather, the forced air stream picks up the heat that escapes above the hot dishes and carries that heat forwardly through the exit grill 54 so that the heat cannot move laterally to the unheated side of the tray.

As a further feature of the invention, each of the three tray modules 10, 11 and 12 comprises vacuum formed top and bottom sections each forming a top or bottom wall of the module and portions of a rear wall and opposed side walls of the module, and a vacuum formed center section forming the balance of the rear and side walls of the module with the center section being folded at the corners of the rear and side walls. The bottom edge of the top section is bonded to the top edge of the center section, and the top edge of the bottom section is bonded to the bottom edge of the center section so as to form a unitary module from the three vaccum formed sections. Thus, referring to FIG. 4, the top section 60 of the tray module 10 is vacuum formed to form the top wall 61 of the module and top portions of the two side walls 28 and 29 and the rear wall. Cavities 62 and 63 are formed in opposite sides of the top section 60 to provide the two uppermost guiding surfaces 42 and 43.

At the lower end of the module, a bottom section 70 forms the bottom wall 71 of the module and lower ends of the side walls 28 and 29 and rear wall. Cavities 72 and 73 formed in the opposed side walls provide the lowermost pair of rails 26 and 27, and a cavity 74 in the rear wall forms the lowermost land 41 on which are mounted the lowermost set of spring contacts 40.

The center section 80 of the module is initially formed with the rear wall and the two side walls 28 and 29 lying in a common plane, as illustrated in phantom lines in FIG. 4. To complete the formation of the center section of the module, the end portions thereof are folded perpendicular to the central portion so that the end portions form the opposed side walls 28 and 29 with the central portion forming the rear wall of the module. In other words, the initial vacuum formed article is folded along lines which become the rear corners of the module.

To form the tray rails 26 and 27 and the cooperating guiding surfaces 42 and 43, a plurality of cavities 81 and 82 are formed in the side walls 28 and 29 so that the upper and lower surfaces of the resulting inner projections form the desired rails and guiding surfaces. More particularly, the upper surfaces of the projections formed by the cavities 81 form the guiderails 26 and the lugs 30, the lower surfaces of these same projections form the guiding surfaces 42, the upper surfaces of the projections formed by the cavities 82 form the rails 27, and the lower surfaces of these latter projections form the guiding surfaces 43. As shown most clearly in FIGS. 4 and 5, the elongated vertical surfaces 83 and 84 of the respective cavities 81 and 82 are preferably formed with an ogee configuration so that the lower region of each tray compartment has a wider dimension than the upper region. This is desirable because most of the food containers carried by the trays extend upwardly into only the lower region of the tray compartment. Also, the runners 21 and 22 on the bottoms of the trays are spaced inwardly from the top peripheries of the trays so the guide rails 26 and 27 formed by the top surfaces of the projections must be wider than the guiding surfaces 42 and 43 formed by the lower surfaces thereof.

To form the multiplicity of lands 41 along the rear wall of the module for supporting the rear ends of the trays and carrying the spring contacts 40, a third series of cavities 85 are formed in the rear wall. The lands 41 formed by these cavities 85 are only slightly wider than the space occupied by the spring contacts 40, and the cavities form vertical front walls of sufficient height to form a rigid mounting surface for the lower ends of the spring contacts 40, and also to provide structural rigidity to the lands 41. As can be seen most clearly in FIG. 6, the lower surfaces of the cavities 85 are spaced substantially above the top surfaces of the trays 16 so that they do not interfere with the food containers carried on the trays.

To form a unitary module from the three vaccum formed sections 60, 70 and 80, the mating upper and lower edges of adjacent sections are provided with continuous lateral flanges which are rigidly bonded together by heat sealing, adhesives or the like. Thus, the bottom edge of the upper section 60 and the top edge of the center section 80 include outboard lateral flanges 86 and 87, respectively, extending continuously around the side and rear walls thereof. Similarly, the top edge of the bottom section 70 and the bottom edge of the center section 80 include outboard lateral flanges 88 and 89, respectively, extending continuously around the side and rear walls. When these two pairs of flanges 86, 87 and 88, 89 are bonded together, the resulting unitary module is completely closed except for the air inlet ports and the open front through which the trays 16 are inserted into and removed from the module.

For the purpose of facilitating mounting and alignment of the vacuum formed module in the desired housing, such as the body of the service cart shown in FIG. 1, a lateral flange 90 also extends outwardly from the entire periphery of the module. This front flange 90 also conceals any gaps or rough surfaces in the interface between the module and the adjacent edges of the housing in which it is mounted. It will be recognized that it is a simple matter to form this flange 90 as an integral part of the three module sections 60, 70 and 80 during the vacuum forming operation.

As can be seen from the foregoing detailed description, this invention provides an improved storage system for trays which contain both hot and cool foods, maintaining a maximum temperature differential between heated and unheated portions of the trays. This storage system holds the trays firmly in place in the storage container, while maintaining a reliable electrical connection between the trays and the storage container, even when the container is portable and subject to vibration and jolts. Furthermore, the entire system can be economically manufactured by vacuum forming, even when it is made large enough to hold ten or more trays carrying full meals. As evidenced by the exemplary embodiment, the system is particularly suitable for use in a food service vehicle.

We claim as our invention:

1. A storage system for hot food trays containing electrical heaters connected to electrical contacts on the rear portions of the trays, said system comprising the combination of
   a. a storage compartment having a plurality of vertically spaced tray support means including vertical shoulders adapted to cooperate with complementary shoulders on the front portion of the trays to latch the trays in the storage compartment when the trays are fully inserted therein,
   b. a plurality of spring contacts within the storage compartment for providing electrical connections with the contacts on the trays while urging the rear portions of the trays carrying the contacts away from said support means,
   c. and guide means for the trays forming a fulcrum located forwardly of said spring contacts toward said latching shoulders rearwardly of said latching shoulders, on the opposite side of the tray from the spring contacts, so that said spring contacts urge the rear portions of the trays upwardly about said fulcrum thereby urging said complementary shoulders on the front portions of the trays downwardly against said latching shoulders on the tray support means.

2. A tray storage system as set forth in claim 1 wherein each side wall of the storage compartment includes a plurality of inwardly projecting members having top surfaces which form said tray support means and bottom surfaces which form said guide means.

3. A tray storage system as set forth in claim 2 wherein said storage compartment is made of vacuum formed plastic sheet and said inwardly projecting members on the side walls and the lands on the rear walls are formed by recesses in the outer surfaces of the side and rear walls.

* * * * *